United States Patent [19]
Meixner et al.

[11] Patent Number: 5,068,125
[45] Date of Patent: Nov. 26, 1991

[54] PROCESS FOR THE PRODUCTION OF COATINGS BASED ON UNSATURATED POLYESTER RESINS BY HARDENING UNDER INFRA-RED RADIATION

[75] Inventors: Jürgen Meixner; Horst Clemens; Armin Sickert, all of Krefeld, Fed. Rep. of Germany

[73] Assignee: Bayer Aktiengesellschaft, Leverkusen, Fed. Rep. of Germany

[21] Appl. No.: 572,348

[22] Filed: Aug. 27, 1990

Related U.S. Application Data

[62] Division of Ser. No. 427,776, Oct. 27, 1989, abandoned.

[30] Foreign Application Priority Data

Nov. 8, 1988 [DE] Fed. Rep. of Germany ....... 3837783

[51] Int. Cl.$^5$ .................. B05D 3/06; C08G 63/66
[52] U.S. Cl. ..................... 427/55; 528/301; 528/274; 106/287.24
[58] Field of Search .......... 427/55, 56.1; 528/301, 528/274; 106/287.24, 287.23, 287.35

[56]  References Cited

U.S. PATENT DOCUMENTS

| 3,042,548 | 7/1962 | Aikens | 427/55 |
| 4,161,556 | 7/1979 | Lenard et al. | 427/55 |
| 4,163,093 | 7/1979 | Hess et al. | 528/301 |

FOREIGN PATENT DOCUMENTS 0154944  9/1985  European Pat. Off. .

Primary Examiner—Shrive Beck
Assistant Examiner—Marianne L. Padgett
Attorney, Agent, or Firm—Connolly and Hutz

[57] ABSTRACT

A coating is obtained on a substrate by applying to the substrate a composition containing as a binder an unsaturated polyester and hardening the coating by infra-red radiation, wherein the binder is a monomer-free olefinically unsaturated polyester resin having a viscosity of 2,000 to 5,000 mPa.s at 23° C. and consists essentially of the esterification reaction product of:

A) 1.0 mol of an unsatured dicarboxylic acid component selected from the group consisting of maleic acid, maleic anhydride, fumaric acid and mixtures thereof,
B) 0.5 to 1.2 mol of a diol component which is a dihydric alcohol with 2 to 8 carbon atoms,
C) 0.5 to 1.1 mol of at least one unsaturated ether component which is a monofunctional hydroxy compound containing one or more $\beta,\gamma$-ethylenically unsaturated alkenyl ether moieties in the molecule, and
D) 0 to 0.55 mol of an alcohol component which is a saturated monohydric alcohol with 4 to 10 carbon atoms.

and the coating composition is useful as an automotive body repair putty.

2 Claims, No Drawings

PROCESS FOR THE PRODUCTION OF COATINGS BASED ON UNSATURATED POLYESTER RESINS BY HARDENING UNDER INFRA-RED RADIATION

This application is a division of application Ser. No. 07/427,776 filed Oct. 27, 1989, now abandoned.

The present invention relates to a new process for the production of coatings on any desired substrates using compositions based on olefinically unsaturated polyester resins, with subsequent hardening of the coatings under the influence of infra-red radiation.

BACKGROUND OF THE INVENTION

In the repair of automobile bodies it is sometimes necessary to apply a composition to a substrate in order to build up or fill in the substrate as, for example, to fill dents in the auto body being repaired. A rough shaping or forming is achieved while the composition is still plastic and formable and a final finish is usually achieved by sanding or filing. Such repair compositions are herein called "stopping compositions" or "auto repair stoppers". Unsaturated polyester resins as binders for stopping compositions, e.g. car repair stoppers, have been known for a long time. However, as a rule they require reactive solvents, such as styrene, as copolymerizable monomers.

One exception is the stopping compositions described in DE-OS 3 409 271, which are based on unsaturated polyesters which have such low viscosities that they can absorb the large quantities of filler characteristic of stopping compositions, and which can be hardened in the absence of copolymerizable monomers with the aid of peroxides to give non-tacky products. Hardening is in general effected at room temperature and resulting coatings which can easily be abraded but which are of a very low hardness are obtained after about 4 hours.

The object of the present invention is to provide a new process for the production of coatings using stopping compositions which, using monomer-free stopping compositions, leads within a short time to surfaces which are hard but can readily be abraded.

BRIEF DESCRIPTION OF THE INVENTION

According to the present invention a coating is obtained on a substrate (for example, an automobile body part) by applying a moldable composition containing as a binder an unsaturated polyester and hardening the coating by infra-red radiation, wherein the binder is a monomer-free olefinically unsaturated polyester resin having a viscosity of 2,000 to 5,000 mPa.s at 23° C. and which consists essentially of the esterification reaction product of A) and unsaturated dicarboxylic acid, B) a diol, C) an unsaturated ether which is a monofunctional hydroxy compound with at least one $\beta,\gamma$-ethylenically unsaturated alkenyl ether moiety, and D) optionally a saturated monohydric alcohol.

DETAILED DESCRIPTION

The invention relates to a process for the production of coatings on any desired substrates by application of a stopping composition containing an unsaturated polyester resin as the binder and subsequent hardening of the coating thus obtained under the influence of infra-red rays, characterized in that the stopping composition used is one which contains, as the binder, a monomer-free olefinically unsaturated polyester resin having a viscosity of 2,000 to 5,000 mPa.s at 23° C. and consisting of A) 1.0 mol of an unsatured dicarboxylic acid component consisting of maleic acid, maleic anhydride and/or fumaric acid, B) 0.5 to 1.2 mol of a diol component consisting of at least one dihydric alcohol with 2 to 8 carbon atoms, C) 0.5 to 1.1 mol of at least one unsaturated ether component consisting of at least one monofunctional hydroxy compound containing one or more $\beta,\gamma$-ethylenically unsaturated alkenyl ether groupings in the molecule, and D) 0 to 0.55 mol of an alcohol component consisting of at least one saturated monohydric alcohol with 4 to 10 carbon atoms.

The binders present in the stopping compositions to be employed according to the invention are unsaturated polyester resins of components A), B), C) and if appropriate D), the components mentioned being employed in the molar amounts stated. Preferably, 0.5 to 1.1 mol component B), 0.5 to 1.0 mol component C) and if appropriate 0 to 0.5 mol component D) are employed per mol component A).

Component A) is maleic acid, maleic anhydride and/or fumaric acid. Preferably, maleic anhydride is employed as component A).

Component B) is at least one dihydric alcohol with 2 to 8 carbon atoms, such as, for example, ethylene glycol, propane-1,2-diol, propane-1,3-diol, butane-1,4-diol, pentane-1,3-diol, hexane-1,6-diol and 2-ethylhexane-1,6-diol, preferably ethylene glycol and propane-1,2-diol.

Component C) is preferably at least one allyl ether of polyhydric alcohols in which one free hydroxyl group in non-etherified form is still present per molecule, such as e.g. trimethylolpropane diallyl ether, glycerol diallyl ether or pentaerythritol triallyl ether, preferably trimethylolpropane diallyl ether.

Component D) which is also used if appropriate in the preparation of the polyester resins is at least one monohydric alcohol with 4 to 10 carbon atoms in the molecule, such as e.g. n-butanol, n-hexanol, isooctanol, benzyl alcohol, cyclohexanol, or $\beta$-phenylethanol, preferably benzyl alcohol.

The unsaturated polyesters are prepared by known methods, e.g. by melt or azeotropic esterification of the alcohols and acids, c.f. "Methoden der organischen Chemie (Methods of Organic Chemistry" (Houben-Weyl), 4th edition, volume 14/2, p.1 to 5, 21 to 33 and 40 to 44, Georg Thieme Verlag, Stuttgart 1961.

The unsaturated polyester resins have a molecular weight, which is determined as the number-average $M_n$ and can be determined by vapour pressure osmometry in dioxane as the solvent, of 500 to 1,200, a viscosity at 23° C. of 2,000 to 5,000 mPa.s and acid numbers of 5 to 50, preferably 10 to 40 mg KOH/g substance.

In order to protect the unsaturated polyesters from undesirable premature crosslinking, it is advisable already to add 0.001 to 0.1 wt.% polymerization inhibitors or antioxidants during the preparation of the polyesters. Suitable stabilizers are described in "Methoden der organischen Chemie (Methods of Organic Chemistry)" (Houben-Weyl), 4th edition, volume 14/1, p. 433 et seq., Georg Thieme Verlag, Stutgart, 1961. p-Benzoquinone, e.g. in a concentration of 0.01 to 0.05 wt.%, based on the polyester, is particularly suitable.

To prepare the stopping compositions, the customary fillers, preferably in amounts of 100 to 350 wt.%, based on the polyester, and pigments as well as drying agents in the customary amounts are added to the unsaturated polyesters.

By drying agents there are understood cobalt salts and manganese salts of acids—such as linseed oil fatty acids, tallow oil fatty acids and soya oil fatty acids—of resin acids—such as abietic acids and naphthenic acids——and of acetic acid or isooctanoic acid. Cobalt octoate and cobalt naphthenate are preferred.

These drying agents are preferably employed in the form of organic solutions in amounts such that the metal content, based on the unsaturated polyester, corresponds to 0.005 to 1 wt.%.

The products can be used without additionally co-polymerizable monomers or solvents, since they are low-viscosity products. However, it is of course possible to add monomers or solvents in cases where an even lower viscosity is desired (spray stoppers).

(Hydro)peroxides are furthermore added to the stopping compositions for hardening. Examples are tert.-butyl hydroperoxide, pinane hydroperoxide, cumene hydroperoxide, methyl ethyl ketone peroxide, cyclohexanone peroxide, dibenzoyl peroxide and tert.-butyl perbenzoate. These (hydro)peroxides are preferably employed in amounts of 0.5 to 10 wt.%, based on the unsaturated polyester.

After the stopping compositions employed according to the invention have been processed by customary methods, the resulting coatings are dried by means of infra-red radiation, the surfaces of the stopping compositions reaching a temperature of about 80 to 110° C. Absolute thorough drying of the sheet-like structures within a few minutes is possible in this manner, hard, After the addition of fillers, a temperature of 35 to 40° C. is reached in this procedure. The cobalt octoate solution is added after cooling to 30° C.

The following recipe is used for the preparation of the stopper:

|  | wt. % |
|---|---|
| Polyester | 30.91 |
| Silicic acid, highly disperse | 0.55 |
| Titanium dioxide (rutile type) | 2.21 |
| Talc | 44.12 |
| Baryte | 22.06 |
| Cobalt octoate solution (10% Co content) | 0.15 |
| Stopping composition | 100.00 |

To test the ease of hardening, 100 g portions of stopping composition are mixed with 2 g cyclohexanone peroxide paste (50% in plasticizer) and the mixture is applied to a degreased and ground metal sheet in a layer thickness of 1 mm.

This metal sheet is then placed in front of a medium wavelength (2×1,000 watt) infra-red lamp (525° C. lamp temperature) at a distance of 30 cm and is irradiated for 5 minutes. The stopper surface reaches a temperature of about 100° C. during this procedure.

After cooling for 10 minutes, the sheet is ground manually by means of emery paper (80 grain).

Evaluation: Wear and loading of the emery paper (from good to nonabradable). The pendulum hardness (according to König, DIN 53 157) is measured after 1 hour.

The results are shown in table 1.

TABLE 1

|  | Examples according to the invention | | | | Comparison examples | |
|---|---|---|---|---|---|---|
|  | 1 | 2 | 3 | 4 | 1 | 2 |
| Starting components (mol) | | | | | | |
| Maleic anhydride | 1.0 | 1.0 | 1.0 | 1.0 | 0.7 | 1.0 |
| Tetrahydrophthalic anhydride | | | | | 0.3 | |
| Ethylene glycol | | | | 0.3 | | |
| Propane-1,2-diol | 0.65 | 0.65 | 1.1 | 0.35 | 0.65 | 0.65 |
| Trimethylolpropane diallyl ether | 1.0 | 0.6 | 1.0 | 0.6 | 1.0 | 0.4 |
| Benzyl alcohol | | 0.4 | | 0.4 | | 0.6 |
| Properties of the polyester | | | | | | |
| Acid number (mg KOH/substance) | 23 | 21 | 31 | 22 | 30 | 19 |
| Viscosity (mPa · s/23° C.) | 3000 | 3000 | 2500 | 3200 | 3600 | 3800 |
| Properties of the hardened stopping composition | | | | | | |
| Pendulum hardness (sec) | 61 | 57 | 60 | 75 | 20 | <10 |
| Abradability | very good | very good | very good | very good | moderate | none | perfectly abradable surfaces being formed.

EXAMPLES

The starting components listed in the following table 1 were subjected to melt condensation at 160 to 180° C. under a stream of nitrogen until the stated acid number was reached. The stopping compositions of the unsaturated polyesters can be prepared in all the customary mixing units, such as dissolvers, planetary mixers, positive kneaders or butterfly mixers.

The stopping compositions described below are prepared in a dissolver as follows:

The polyester, highly disperse silicic acid and pigment are pre-dispersed at a low speed of rotation at a container/disc diameter ratio of about 2:1 and about 80% of the fillers are added. The residual fillers are introduced at increasing speeds of rotation (higher peripheral speed).

Whilst the unsaturated polyester resins of examples 1 to 4 according to the invention lead to stopping compositions which show good abradability and little loading of the emery paper coupled with a good hardness afer infrared hardening, comparison example 1 using an amount of maleic anhydride which is not according to the invention and comparison example 2 using an amount of trimethylolpropane diallyl ether which is not according to the invention show poorer properties.

What is claimed is:

1. In the process for the production of coatings on a substrate by applying to the substrate a composition containing an unsaturated polyester resin as the binder and subsequently hardening the coating thus obtained by infra-red radiation, the improvement comprises having the composition contain, as the binder, a monomer-free olefinically unsaturated polyester resin having a viscosity of 2,000 to 5,000 mPa.s at 23° C. and consisting essentially of the reaction product of:
A) 1.0 mol of an unsatured dicarboxylic acid component selected from the group consisting of maleic acid, maleic anhydride, fumaric acid and mixtures thereof,
B) 0.5 to 1.2 mol of a diol component which is a dihydric alcohol with 2 to 8 carbon atoms,
C) 0.5 to 1.1 mol of at least one unsaturated ether component which is a monofunctional hydroxy compound containing one or more $\beta,\gamma$-ethylenically unsaturated alkenyl ether moieties in the molecule, and
D) 0 to 0.55 mol of an alcohol component which is a saturated monohydric alcohol with 4 to 10 carbon atoms.

2. Process according to claim 1 wherein amount of component B) is 0.5 to 1.1 mol, the amount of component C) is 0.5 to 1.0 mol and the amount of component D) is 0 to 0.5 mol, per mol of component A).

* * * * *